(12) United States Patent
Shiraishi

(10) Patent No.: US 8,720,511 B2
(45) Date of Patent: May 13, 2014

(54) RUN FLAT TIRE

(75) Inventor: Fumihiro Shiraishi, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 1103 days.

(21) Appl. No.: 12/095,516

(22) PCT Filed: Nov. 28, 2006

(86) PCT No.: PCT/JP2006/323677
§ 371 (c)(1),
(2), (4) Date: Jun. 5, 2008

(87) PCT Pub. No.: WO2007/063831
PCT Pub. Date: Jun. 7, 2007

(65) Prior Publication Data
US 2008/0295941 A1 Dec. 4, 2008

(30) Foreign Application Priority Data
Nov. 30, 2005 (JP) .................. 2005-346115

(51) Int. Cl.
*B60C 17/04* (2006.01)
(52) U.S. Cl.
USPC ........... 152/517; 152/516; 152/518; 152/519; 152/520; 152/521; 152/522; 152/525; 152/548; 152/552; 152/564
(58) Field of Classification Search
USPC ......... 152/516, 517, 518, 519, 520, 521, 522, 152/525, 548, 552, 564
See application file for complete search history.

(56) References Cited

U.S. PATENT DOCUMENTS 4,319,619 A * 3/1982 Kozima et al. ................ 152/564
4,779,658 A 10/1988 Kawabata et al.
6,220,326 B1 * 4/2001 Blok et al. .................... 152/564
6,263,935 B1 7/2001 Oare et al.
6,330,897 B1 * 12/2001 Nakamura et al. ............ 152/564
6,619,354 B1 * 9/2003 Kobayashi et al. ........... 152/517
6,672,351 B1 1/2004 Gerresheim et al.
6,759,136 B2 7/2004 Kanenari et al.

FOREIGN PATENT DOCUMENTS

DE 199 41 340 A1 3/2001
EP 1 160 101 A2 12/2001
(Continued)

OTHER PUBLICATIONS

Extended European Search Report dated Dec. 15, 2009 (7 pages)

*Primary Examiner* — Timothy Kennedy
(74) *Attorney, Agent, or Firm* — Sughrue Mion, PLLC

(57) ABSTRACT

A run flat tire which comprises a ply layer (4) disposed extending toroidally between a pair of bead cores and comprising ply coating rubber and ply cords, an inner liner layer (5) disposed circumferentially at an inner side of the ply layer, side reinforcing rubber layers (6) having an approximately crescent-shaped cross section and disposed in side portions of the tire between the ply layer and the inner liner layer and rubber sheets (7) disposed extending at interface of the ply layer and the side reinforcing rubber layer, wherein relations of $t_{90} > t_{p10}$ and $t_{10} < t_{s90}$ are satisfied when characteristic values of vulcanization obtained in accordance with JIS K6300-2 are represented by $t_{p10}$ and $t_{p90}$ for the ply coating rubber, $t_{s10}$, and $t_{s90}$ for the side reinforcing rubber and $t_{10}$ and $t_{90}$ for the rubber for a sheet. Run flat durability is increased by suppressing crack growth in the side reinforcing rubber layer having an approximately crescent-shaped cross section and increasing peel strength between the ply coating rubber and the side reinforcing rubber, using a general purpose rubber.

4 Claims, 2 Drawing Sheets

(56) References Cited

FOREIGN PATENT DOCUMENTS

| | | |
|---|---|---|
| FR | 2 469 297 | 5/1981 |
| JP | 2001-315510 A | 11/2001 |
| JP | 2002-19431 A | 1/2002 |
| JP | 2002-030187 A | 1/2002 |
| JP | 2002-301911 A | 10/2002 |
| JP | 2004-90832 A | 3/2004 |
| JP | 2004-276699 A | 10/2004 |
| JP | 2005-47441 A | 2/2005 |

* cited by examiner

RUN FLAT TIRE

CROSS REFERENCE TO RELATED APPLICATIONS

This application is a National Stage of International Application No. PCT/JP2006/323677 filed on Nov. 28, 2006, claiming priority based on Japanese Application No. 2005-346115, filed on Nov. 30, 2005, the contents of all of which are incorporated herein by reference in their entirety.

TECHNICAL FIELD

The present invention relates to a run flat tire and, more particularly, to a run flat tire exhibiting an increased run flat durability by suppressing crack growth in the side reinforcing rubber layer having an approximately crescent-shaped cross section and increasing peel strength between the ply coating rubber and the side reinforcing rubber.

BACKGROUND ART

In conventional run flat tires, a pair of rubber layers having an approximately crescent-shaped cross section for reinforcing side portions (occasionally referred to as side reinforcing rubber layers, hereinafter) are disposed to increase rigidity of the side wall portions. However, when a tire is driven under a decreased inner pressure of a tire due to puncture or the like cause, i.e., in the condition of run flat driving, deformation of the side reinforcing rubber is increased as deformation of the side wall portions of the tire is increased, and heat buildup is increased. The temperature of the tire occasionally reaches 200° C. or higher. Under such a condition, there is the possibility that the condition in the side reinforcing rubber layer exceeds the limit of failure and the tire is damaged.

To improve the performance under the run flat condition, application of styrene-butadiene rubber (SBR) having a high vinyl structure and application of a phenol resin are conducted so that heat resistance of the rubber composition for the side reinforcement is improved.

Suppressing heat buildup of the entire tire is another effective method for improving the performance under the run flat condition. Means for decreasing the heat buildup of the side reinforcing rubber and the ply coating rubber are conducted.

Although these means can exhibit the effect of improving the performance under the run flat condition, the necessity in the market for farther improvement in the performance under the run flat condition is increasing, and a tire exhibiting more excellent performance under the run flat condition is desired.

When a tire damaged after the run flat driving is observed, it is found that cracks first grow in the side reinforcing rubber layer of the run flat tire in the vicinity of the portion having the maximum gauge (thickness) from the side of the inner liner to the side of the ply coating rubber. Separation takes place at the interface of the side reinforcing rubber and the ply coating rubber to which cracks grow, and the side reinforcing rubber is peeled off to damage the tire.

In Patent Reference 1, a technology in which a rubber sheet is disposed extending along the interface of a side reinforcing rubber layer comprising a hydrogenated NBR composition and a ply coating rubber layer comprising a general purpose diene-based rubber so that problems on adhesion of rubber layers due to insufficient compatibility between polymers are overcome, is disclosed.

However, in the technology disclosed in Patent Reference 1, a specific rubber is required, and problems arise from the standpoint of the cost and the control of the material. Therefore, it is desired that the above problems are overcome by using a general purpose rubber and a simpler method.

[Patent Reference 1] Japanese Patent Application Laid-Open No. 2002-30187

DISCLOSURE OF THE INVENTION

Under the above circumstances, the present invention has an object of providing a run flat tire exhibiting an increased run flat durability by suppressing crack growth in the side reinforcing rubber and increasing peel strength between the ply coating rubber and the side reinforcing rubber.

Intensive studies were conducted by the present inventor to achieve the above object. The side reinforcing rubber having an approximately crescent-shaped cross section has the maximum thickness as thick as about 5 to 12 mm although the specific thickness varies depending on the size of the tire and is disposed at the inside of the tire. Therefore, the rate of vulcanization of the side reinforcing rubber is set at a greater value so that the sufficient degree of vulcanization is surely obtained at the inside of the side reinforcing rubber when the tire is vulcanized.

In contrast, the ply coating rubber has a gauge as thin as about 0.7 to 2 mm, and the sufficient degree of vulcanization can be surely obtained in the vulcanization. Therefore, the rate of vulcanization of the ply coating rubber is set at a smaller value to prevent scorching of the rubber in the production step (in the step of calendering). The rates of vulcanization in the side reinforcing rubber and in the ply coating rubber which are adjacent to each other are greatly different. It was found that the proper property for covulcanization of the two members of the tire was not exhibited at the interface of the two members in the vulcanization of the tire. It was found that the above object could be achieved by disposing a rubber sheet having a specific rate of vulcanization between the two members. The present invention has been completed based on the knowledge.

The present invention provides:

(1) A run flat tire which comprises (a) a ply layer disposed extending toroidally between a pair of bead cores and comprising ply coating rubber and ply cords, (b) an inner liner layer disposed circumferentially at an inner side of the ply layer (a), (c) side reinforcing rubber layers having an approximately crescent-shaped cross section and disposed in side portions of the tire between the ply layer (a) and the inner liner layer (b) and (d) rubber sheets disposed extending along interface of the ply layer (a) and the side reinforcing rubber layer having an approximately crescent-shaped cross section (c), wherein relations of $t_{90}>t_{p10}$ and $t_{10}<t_{s90}$ are satisfied when characteristic values of vulcanization of the ply coating rubber constituting the ply layer (a) are represented by $t_{p10}$ and $t_{p90}$, characteristic values of vulcanization of a side reinforcing rubber constituting the side reinforcing rubber layer having an approximately crescent-shaped cross section (c) are represented by $t_{s10}$ and $t_{s90}$ and characteristic values of vulcanization of rubber for a sheet constituting the rubber sheet (d) are represented by $t_{10}$ and $t_{90}$,

[the characteristic values of vulcanization being obtained in accordance with Japanese Industrial Standard K6300-2, $t_{p10}$, $t_{s10}$ and $t_{10}$ each representing a time for 10% vulcanization (an induction time) of the ply coating rubber, the side reinforcing rubber and the rubber for a sheet, respectively, and $t_{p90}$, $t_{s90}$ and $t_{90}$ each representing a time for 90% vulcanization (an optimum vulcanization time) of the ply coating rubber, the side reinforcing rubber and the rubber for a sheet, respectively];

(2) A run flat tire described in (1), wherein a relation of $t_{s90}<t_{90}<t_{p90}$ is satisfied;
(3) A run flat tire described in any one of (1) and (2), wherein a thickness of the rubber sheet (d) is 0.3 to 3.0 mm;
(4) A run flat tire described in any one of (1) to (3), wherein the rubber for a sheet has a loss tangent (Tan δ) at most 1.3 times as great as Tan δ of the side reinforcing rubber and a modulus (100% Mod) and a dynamic modulus (E') in a range of 0.7 to 1.3 times as great as 100% Mod and E', respectively, of the side reinforcing rubber; and
(5) A run flat tire described in any one of (1) to (4), wherein rubber components in the side reinforcing rubber and the rubber for a sheet comprise at least one rubber selected from natural rubber, styrene-butadiene rubber and butadiene rubber.

BRIEF DESCRIPTION OF THE DRAWINGS

In FIG. 2, reference numerals mean as follows:
1: A tread portion
2: A side portion
3: A bead core
4: A ply layer
5: An inner liner
6: A side reinforcing rubber layer
7: A rubber sheet

THE MOST PREFERRED EMBODIMENT TO CARRY OUT THE INVENTION

It is required that, in a run flat tire which comprises (a) a ply layer disposed extending toroidally between a pair of bead cores and comprising ply coating rubber and ply cords, (b) an inner liner layer disposed circumferentially at the inner side of the ply layer (a), (c) side reinforcing rubber layers having an approximately crescent-shaped cross section and disposed in side portions of the tire between the ply layer (a) and the inner liner layer (b) and (d) rubber sheets disposed extending along the interface of the ply layer (a) and the side reinforcing rubber layer having an approximately crescent-shaped cross section (c), relations of $t_{90}>t_{p10}$ and $t_{10}<t_{s90}$ be satisfied when characteristic values of vulcanization of the ply coating rubber constituting the ply layer (a) are represented by $t_{p10}$ and $t_{p90}$, characteristic values of vulcanization of a side reinforcing rubber constituting the side reinforcing rubber layer having an approximately crescent-shaped cross section (c) are represented by $t_{s10}$ and $t_{s90}$ and characteristic values of vulcanization of rubber for a sheet constituting the rubber sheet (d) are represented by $t_{10}$ and $t_{90}$.

In the above, the characteristic values of vulcanization is obtained in accordance with the Japanese Industrial Standard (JIS) K6300-2. $t_{10}$, $t_{10}$ and $t_{10}$ each represent a time for 10% vulcanization (the induction time) of the ply coating rubber, the side reinforcing rubber and the rubber for a sheet, respectively, and $t_{p90}$, $t_{s90}$ and $t_{90}$ each represent a time for 90% vulcanization (the optimum vulcanization time) of the ply coating rubber, the side reinforcing rubber and the rubber for a sheet, respectively.

In the present invention, the physical properties of the rubber compositions in the process of vulcanization are obtained in accordance with "the methods of obtaining characteristic values of vulcanization using a vibration type tester" described in JIS K6300-2:2001 mentioned above.

The physical properties of a rubber composition are changed to a great degree in the step of vulcanization. The characteristic values of vulcanization can be obtained by measuring these values as functions of the temperature. The characteristic value of vulcanization can be measured using a vulcanization tester such as a disk vulcanization tester (a rotor vulcanization tester) and a die vulcanization tester (a rotorless vulcanization tester). A stress or a strain is applied repeatedly by the above apparatus, and the strain or the stress generated by the stress or the strain, respectively, is calculated.

In general, the vulcanization test is conducted at a constant temperature, and the rigidity (expressed as the torque or the shearing force) is continuously recorded as the function of the time.

Figure 1:
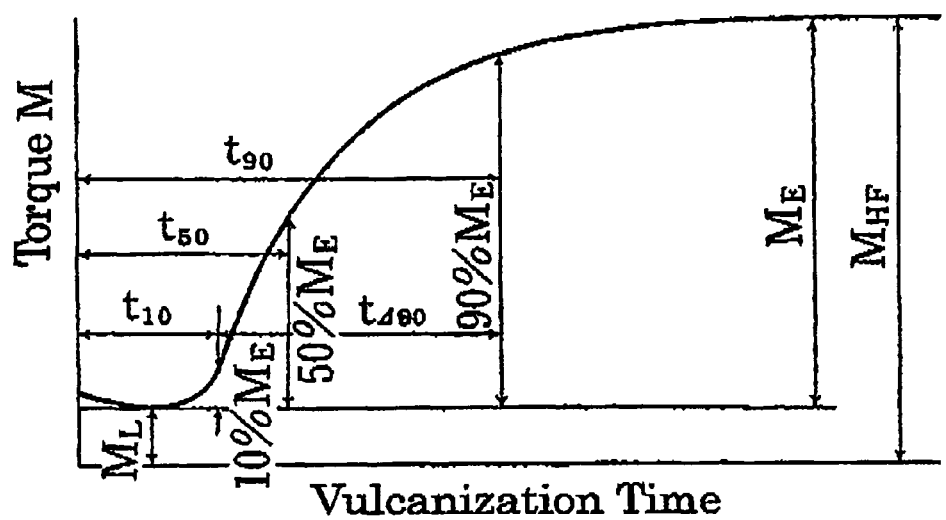
FIG. 1 shows a schematic diagram exhibiting the method of analysis of the vulcanization curve.

In FIG. 1, an example of the recorded change of torque with the time is shown. The vertical axis shows the torque (M), and the horizontal as shows the vulcanization time. The points on the vulcanization curve showing the minimum value and the maximum value of the torque are represented by $M_L$ and $M_{HE}$, respectively. Two straight lines passing $M_L$ and $M_{HE}$ and parallel with the time axis are drawn. The distance between the two straight lines is represented by $M_E$ ($M_E=M_{HE}-M_L$).

Staight lines at the values of $M_L+10\% M_E$, $M_L+50\% M_E$ and $M_L+90\% M_E$ on the vertical axis and parallel with the time axis are drawn, and intersections of the drawn lines with the vulcanization curve are obtained. Time intervals from the time of starting the test to the time at the intersections (the vulcanization times) are obtained and represented by $t_{10}$, $t_{50}$ and $t_{90}$ for the straight lines at the values of $M_L+10\% M_E$, $M_L+50\% M_E$ and $M_L+90\% M_E$, respectively. The time interval represented by $t_{10}$ show the induction time, the time interval represented by $t_{50}$ shows the time of 50% vulcanization, and the time interval represented by $t_{90}$ shows the time of 90% vulcanization (the optimum vulcanization time).

In the present invention, it is necessary that the characteristic value of vulcanization of the ply coating rubber constituting the ply coating layer (a) represented by $t_{p10}$ and the characteristic value of vulcanization of the rubber for a sheet constituting the rubber sheet (d) represented by $t_{90}$ satisfy the relation of $t_{90}>t_{p10}$, and the characteristic value of vulcanization of the rubber for a sheet represented by $t_{10}$ and the characteristic value of vulcanization of the side reinforcing rubber constituting the side reinforcing rubber layer having an approximately crescent-shaped cross section (c) represented by $t_{s90}$ satisfy the relation of $t_{10}<t_{s90}$. By adjusting the above characteristic values of vulcanization in the above ranges, the peeling strength between the ply coating rubber and the side reinforcing rubber can be increased with the rubber for a sheet at the interface of the ply coating rubber and the side reinforcing rubber.

It is preferable that the times of 90% vulcanization (the optimum vulcanization times) of the three rubber members satisfy the relation of $t_{s90}<t_{90}<t_{p90}$. By adjusting the time of 90% vulcanization (the optimum vulcanization time) of the rubber for a sheet constituting the rubber sheet (d) which is disposed extending at the interface of the ply layer (a) and the side reinforcing rubber layer having an approximately crescent-shaped cross section (c) to a value between the corresponding values of the poly coating rubber and the side reinforcing rubber, the peeling strength between the ply coating rubber and the side reinforcing rubber can be increased with the rubber for a sheet at the interface of the ply coating rubber and the side reinforcing rubber.

The characteristic values of vulcanization of the side reinforcing rubber, the rubber for a sheet and the ply coating rubber in the present invention such as the values represented by $t_{p10}$, $t_{s10}$, $t_{10}$, $t_{p90}$, $t_{s90}$ and $t_{90}$ can be adjusted by the amounts of the vulcanizing agents and vulcanization accelerators based on 100 parts by mass of the rubber component and the combination of the vulcanizing agents and vulcanization accelerators.

Examples of the vulcanizing agent include sulfur, insoluble sulfur and examples of the vulcanization accelerator include guanidine-based vulcanization accelerators typical examples of which include diphenylguanidine, thiuram-based vulcanizing accelerators typical examples of which include tetramethylthiuram disulfide, thiazole-based vulcanizing accelerators typical examples of which include dibenzothiazyl disulfide, dithiocarbamic acid salt-based vulcanizing accelerators typical examples of which include zinc dithiocarbamate and sulfenamide-based vulcanizing accelerators typical examples of which include N-cyclohexyl-2-benzothiazylsulfenamide. Among these vulcanizing accelerators, the thiuram-based vulcanizing accelerators and the thiazole-based vulcanizing accelerators are preferable.

It is preferable that the thickness of the rubber sheet (d) in the present invention is 0.3 to 3.0 mm and more preferably 0.5 to 1.5 mm. By adjusting the thickness of the rubber sheet in the above range, the peeling strength between the ply coating rubber and the side reinforcing rubber can be increased with the rubber of a sheet at the interface of the ply coating rubber and the side reinforcing rubber.

It is preferable that the rubber for a sheet in the present invention has a loss tangent (Tan δ) at most 1.3 times as great as Tan δ of the side reinforcing rubber and a modulus (100% Mod) and a dynamic modulus (E') in the range of 0.7 to 1.3 times as great as 100% Mod and E', respectively, of the side reinforcing rubber.

It is preferable that the rubber for a sheet has Tan δ at most 1.3 times as great as Tan δ of the side reinforcing rubber as described above, and it is more preferable that the rubber for a sheet has Tan δ at most 1.1 times as great as Tan δ of the side reinforcing rubber. By adjusting the toss tangent (Tan δ) in the above range, the heat buildup at the side portion can be suppressed even when the rubber sheet is disposed extending at the interface of the ply layer and the side reinforcing rubber layer. It is preferable that the rubber for a sheet has a modulus (100% Md) and a dynamic modulus (E') in the range of 0.7 to 1.3 times as great as 100% Md and E', respectively, of the side reinforcing rubber as described above, and it is more preferable that the rubber for a sheet has 100% Md and E' in the range of 0.7 to 1.0 times as great as 100% Md and E', respectively, of the side reinforcing rubber. By adjusting the modulus at a great strain (100% Md) and the dynamic modulus (E') at a small strain in the above range, the difference between the moduli of the side reinforcing rubber and the rubber for a sheet can be decreased as much as possible. Thus, stress concentration at the interface of the side reinforcing rubber layer and the rubber sheet can be prevented when the side portion is strained, and the peeling strength between the side reinforcing rubber layer and the rubber sheet can be increased.

It is preferable that the rubber components in the side reinforcing rubber and the rubber sheet in the present invention comprise at least one rubber selected from natural rubber, styrene-butadiene rubber and butadiene rubber. Among these rubbers, the combination of natural rubber and butadiene rubber is preferable since the heat buildup is small, and the property for covulcanization of the side reinforcing rubber and the ply coating rubber is excellent.

For the rubber for a sheet in the present invention, carbon black, silica and inorganic fillers are used as the reinforcing filler. In general, it is preferable that carbon black is used singly although carbon black, silica and inorganic fillers may be used in combination.

Examples of carbon black include channel black, face black, acetylene black and thermal black in accordance with the process for the production. Although any of the above carbon blacks can be used, furnace black is preferable. Example of the furnace black include SRF, GPF, FEF, HAF, ISAF and SAF. It is preferable that the type of carbon black is suitably selected in accordance with the application. For the rubber for a sheet, carbon black of the FEF grade or the HAF grade is preferable from the standpoint of simultaneously suppressing the heat buildup and the crack growth.

The rubber for a sheet in the present invention may further comprise, where desired, various chemicals conventionally used in the rubber industry other than the above components as long as the effect of the present invention is not adversely affected. Examples of the chemical include zinc oxide (zinc flower), stearic acid, antioxidants and softeners.

The rubber for a sheet in the present invention can be obtained using a mixer such as rolls and an internal mixer and advantageously used as the rubber sheet after molding and vulcanization. The run flat tire of the present invention can be produced in accordance with a conventional process using the rubber compositions described above.

Figure 2:
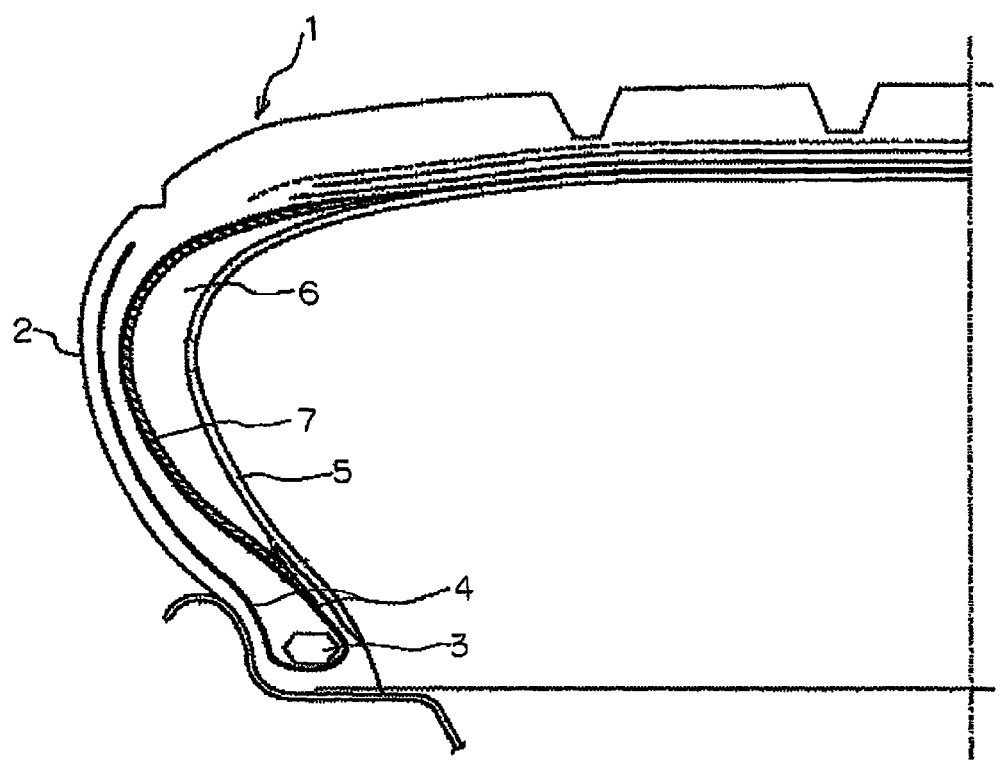
FIG. 2 shows a partial sectional view exhibiting an example of the tire of the present invention.

FIG. 2 shows a partial sectional view exhibiting an example of the run flat tire of the present invention obtained by using the rubber sheet described above. The tire comprises a tread portion 1 and a side portion 2. The tire further comprises a carcass layer 4 which comprises carcass plies having cords disposed in the radial direction and is folded around bead cores 3, an inner liner layer 5 disposed circumferentially at the inner side of the carcass layer 4, side reinforcing rubber layer 6 having an approximately crescent-shaped cross section and disposed in the tire side portions 2 between the play layer 4 and the inner liner layer 5, and a rubber sheet 7 disposed extending along the interface of the ply layer 4 and the side reinforcing rubber layer 6 having an approximately crescent-shaped cross section.

EXAMPLES

The present invention will be described more specifically with reference to examples in the following. However, the present invention is not limited to the examples.

<Evaluation of an Unvulcanized Rubber>

1. Measurement of Characteristic Values of Vulcanization

The characteristic values of vulcanization were measured using CURASTOMETER W Type manufactured by JSR TRADING Co., Ltd. in accordance with the method of JIS K3200-2:2001

<Evaluation of a Vulcanized Rubber>

1. Measurement of Modulus (100% Md)

The modulus (100% Md) was measured in accordance with the method of JIS K6251.

2. Measurements of Dynamic Modulus (E') and Loss Tangent (Tan δ) at Dynamic Strain of 1%

A sample having a thickness of 2 mm, a width of 4.7 mm and a lend of 40 mm was prepared from a slab sheet obtained by vulcanizing a rubber composition at 160° C. for 12 minutes and having a thickness of 2 mm, and the dynamic modulus (E') and the loss tangent (Tan δ) at the strain of 1% were measured using a viscoelasticity spectrometer manufactured by TOYO SEIKI SEISAKUSHO Co., Ltd. under the condition of an initial load of 1.57 N, a temperature of 25° C., a frequency of 52 Hz and a dynamic strain of 1%.

<Evaluation of Sample Tire>

1. Run Flat Driving Distance on Drum

A sample tire (the tire size: 245/40ZR18) was attached to a rim under an ordinary pressure. After an inner pressure of 230 kPa was applied, the pressurized tire was left standing in a room at 38° C. for 24 hours. Then, the inner pressure was released to the atmospheric pressure by removing the core of the valve, and the driving test was conducted on a drum under a load of 5.19 kN (530 kg) at a speed of 89 km/h at the room temperature of 38° C. The distance driven before being damaged was used as the run flat driving distance. The longer the driving distance, the better the run flat durability.

2. Examination of Separation at the Interface

The presence or the absence of separation at the interface on the ply coating rubber portion of a tire was examined by visual observation after the run flat diving on a drum.

<Preparation of Rubber Compositions for a Side Reinforcing Rubber, a Ply Coating Rubber and Rubbers for a Sheet A to D>

The above rubber compositions were prepared and evaluated in accordance with the following procedures. Rubber components of types and amounts shown in Table 1, the sum of the amounts being 100 parts by mass, carbon black of a type and an amount shown in Table 1, 1 part by mass of stearic acid, 5 part by mass of zinc oxide, vulcanization accelerators of types and amounts shown in Table 1 and sulfur in an amount shown in Table 1 were mixed using a Banbury mixer in accordance with a conventional process, and an unvulcanized rubber was obtained. The characteristic values of vulcanization ($t_{10}$, $t_{s10}$, $t_{p10}$, $t_{90}$, $t_{s90}$ and $t_{p90}$) were measured using the unvulcanized rubber. The results of the measurements are shown in Table 1. The unvulcanized rubber was vulcanized in accordance with a conventional process, and a sample was prepared. The modulus (100% Md), the dynamic modulus (E') and the loss tangent (Tan δ) were measured using the prepared sample, and the obtained results are shown in Table 1.

TABLE 1

|  | Side reinforcing rubber | Ply coating rubber | Rubber for sheet A | Rubber for sheet B | Rubber for sheet C | Rubber for sheet D |
|---|---|---|---|---|---|---|
| Formulation (phr) |  |  |  |  |  |  |
| natural rubber | 30.0 | 70.0 | 30.0 | 30.0 | 70.0 | 30.0 |
| butadiene rubber *1 | 70.0 | — | 70.0 | 70.0 | — | 70.0 |
| styrene-butadiene rubber *2 | — | 30.0 | — | — | 30.0 | — |
| carbon black (FEF) *3 | 50.0 | — | 50.0 | 50.0 | — | 50.0 |
| carbon black (HAF) *4 | — | 40.0 | — | — | 40.0 | — |
| vulcanization accelerator (CZ) *5 | 4.0 | — | 3.0 | 2.0 | — | — |
| vulcanization accelerator (DM) *6 | — | 0.5 | — | 13 | 0.2 | — |
| vulcanization accelerator (NS) *7 | — | 0.5 | — | — | 0.5 | 1.0 |
| sulfur | 6.0 | 3.0 | 6.0 | 5.0 | 3.0 | 3.0 |
| Characteristic values of vulcanization (min) |  |  |  |  |  |  |
| $t_{10}$ | — | — | 2.0 | 2.4 | 2.5 | 3.2 |
| $t_{90}$ | — | — | 4.4 | 6.9 | 7.1 | 7.5 |
| $ts_{10}$ | 1.9 | — | — | — | — | — |
| $ts_{90}$ | 2.9 | — | — | — | — | — |
| $tp_{10}$ | — | 1.8 | — | — | — | — |
| $tp_{90}$ | — | 7.6 | — | — | — | — |
| Physical properties |  |  |  |  |  |  |
| 100% Md (MPa) | 12.5 | 4.0 | 10.9 | 10.3 | 8.6 | 11.2 |
| dynamic modulus E' at 1% strain (MPa) | 16.0 | 6.4 | 14.5 | 13.4 | 12.9 | 15.7 |
| loss tangent Tan δ at 1% strain | 0.088 | 0.152 | 0.093 | 0.091 | 0.118 | 0.087 |

Notes
*1 Butadiene rubber: the trade name: "BR01"; manufactured by JSR Co., Ltd.
*2 Styrene-butadiene rubber: the trade name: "JSR 1778"; manufactured by JSR Co., Ltd.
*3 Carbon black (FEF) the trade name: "ASAHI #65"; manufactured by ASAHI CARBON Co., Ltd.
*4 Carbon black (HAF): the trade name "ASAHI #70-NP"; manufactured by ASAHI CARBON Co., Ltd.
*5 Vulcanization accelerator (CZ): N-cyclohexyl-2-benzothiazylsulfenamide
*6 Vulcanization accelerator (DM): dibenzothiazyl disulfide
*7 Vulcanization accelerator (NS): N-tert-butyl-2-benzothiazylsulfenamide Examples 1 to 4 and Comparative Examples 1 to 4

Sample tires (the tire size: 245/40ZR18), each having a rubber sheet the type and the thickness of which are shown in Table 2, were prepared in accordance with a conventional process. The run flat driving distance on a drum were measured, and the presence or the absence of separation at the interface on the ply coating rubber portion was examined by visual observation after the run flat driving. The results were used for the final evaluation. The conventional run flat tire having no rubber sheet (Comparative Example 1) was used as the reference. The results of the measurement, the examination and the evaluation are shown in Table 2.

TABLE 2

|  | Comparative Example 1 | Example 1 | Example 2 | Example 3 | Example 4 | Comparative Example 2 | Comparative Example 3 | Comparative Example 4 |
|---|---|---|---|---|---|---|---|---|
| Rubber sheet | none | A | A | A | B | A | C | D |
| Thickness of rubber sheet (mm) | — | 0.6 | 1.2 | 2.4 | 1.2 | 3.2 | 1.2 | 1.2 |
| Distance of run flat driving on drum (km) | 52 | 68 | 75 | 59 | 65 | 39 | 41 | 44 |
| Separation at interface | found | none | none | none | none | none | none | found |
| Evaluation | poor | good | good | good | good | poor | poor | poor |

It is shown by the results in Table 2 that, when the rubber sheet having an optimum vulcanization time ($t_{90}$) between the corresponding values of the side reinforcing rubber and the ply coating rubber was disposed extending along the interface of the side reinforcing rubber layer and the ply coating rubber layer, no separation took place at the interface on the ply coating rubber portion, and the run flat durability was improved.

When the thickness of the rubber sheet disposed as described above exceeded 3.0 mm, the run flat durability decreased although the separations did not take place at the interface (Comparative Example 2).

When Tan δ of the rubber sheet exceeded the value 1.3 times as great as the value of the side reinforcing rubber, the run flat durability decreased although the separation did not take place at the interface (Comparative Example 3).

When the induction time ($t_{10}$) of the rubber sheet exceeded the optimum vulcanization time ($t_{s90}$) of the side reinforcing rubber, separations took place at the interface of the side reinforcing rubber and the rubber sheet, and the run flat durability decreased.

INDUSTRIAL APPLICABILITY

The present invention provides the run flat tire exhibiting improved run flat durability by suppressing crack growth in the side reinforcing rubber by disposing between the ply layer and the side reinforcing rubber layer a rubber sheet having a rate of vulcanization between the corresponding values of the ply coating rubber and the side reinforcing rubber and by increasing the peeling strength between the ply coating rubber and the side reinforcing robber with the rubber sheet disposed extending along the interface of the ply coating rubber and the side reinforcing rubber.

The invention claimed is:

1. A run flat tire which comprises
   (a) a ply layer disposed extending toroidally between a pair of bead cores and comprising ply coating rubber and ply cords,
   (b) an inner liner layer disposed circumferentially at an inner side of the ply layer (a),
   (c) a side reinforcing rubber layer having an approximately crescent-shaped cross section and disposed in side portions of the tire between the ply layer (a) and the inner liner layer (b) and
   (d) a rubber sheet disposed so as to extend along an interface of the ply layer (a) and the side reinforcing rubber layer having an approximately crescent-shaped cross section (c),
   wherein relations of $t_{90}>t_{p10}$, $t_{10}<t_{s90}$ and $t_{s90}<t_{90}<t_{p90}$ are satisfied when characteristic values of vulcanization of the ply coating rubber constituting the ply layer (a) are represented by $t_{p10}$ and $t_{p90}$, characteristic values of vulcanization of a side reinforcing rubber constituting the side reinforcing rubber layer having an approximately crescent-shaped cross section (c) are represented by $t_{s10}$ and $t_{s90}$ and characteristic values of vulcanization of rubber for a sheet constituting the rubber sheet (d) are represented by $t_{10}$ and $t_{90}$,
   [the characteristic values of vulcanization being obtained in accordance with Japanese Industrial Standard K6300-2, $t_{p10}$, $t_{s10}$ and $t_{10}$ each representing a time for 10% vulcanization (an induction time) of the ply coating rubber, the side reinforcing rubber and the rubber for a sheet, respectively, and $t_{p90}$, $t_{s90}$ and $t_{90}$ each representing a time for 90% vulcanization (an optimum vulcanization time) of the ply coating rubber, the side reinforcing rubber and the rubber for a sheet, respectively].

2. A run flat tire according to claim 1, wherein a thickness of the rubber sheet (d) is 0.3 to 3.0 mm.

3. A run flat tire according to claim 1, wherein the rubber for a sheet has a loss tangent (Tan δ) measured at 25° C. at most 1.3 times as great as Tan δ of the side reinforcing rubber and a modulus (100% Mod) and a dynamic modulus (E') in a range of 0.7 to 1.3 times as great as 100% Mod and E', respectively, of the side reinforcing rubber.

4. A run flat tire according to claim 1, wherein rubber components in the side reinforcing rubber and the rubber for a sheet comprise at least one rubber selected from natural rubber, styrene-butadiene rubber and butadiene rubber.

* * * * *